US009571490B2

(12) United States Patent
Fu et al.

(10) Patent No.: US 9,571,490 B2
(45) Date of Patent: *Feb. 14, 2017

(54) METHOD AND SYSTEM FOR DISTINGUISHING HUMANS FROM MACHINES

(71) Applicant: Alibaba Group Holding Limited, Grand Cayman (KY)

(72) Inventors: Yingfang Fu, Beijing (CN); Yudong Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/978,138

(22) Filed: Dec. 22, 2015

(65) Prior Publication Data

US 2016/0191516 A1     Jun. 30, 2016

Related U.S. Application Data

(63) Continuation of application No. 14/197,064, filed on Mar. 4, 2014, now Pat. No. 9,258,302.

(30) Foreign Application Priority Data

Mar. 5, 2013 (CN) .......................... 2013 1 0068736

(51) Int. Cl.
    *H04L 29/06*      (2006.01)
    *G06F 21/32*      (2013.01)
    (Continued)

(52) U.S. Cl.
    CPC ........... *H04L 63/0861* (2013.01); *G06F 21/32* (2013.01); *H04L 63/083* (2013.01); *G06F 3/167* (2013.01);
    (Continued)

(58) Field of Classification Search
    CPC ........ G10L 17/22; G10L 15/063; G10L 15/00; G10L 15/265; G10L 2015/0631; G10L 25/48; G10L 25/51; G10L 25/69; G06F 3/167; G06F 21/32; H04L 63/0861; G06Q 20/40145
    See application file for complete search history.

(56) References Cited

U.S. PATENT DOCUMENTS 5,838,812 A * 11/1998 Pare, Jr. .................. G06F 21/32
    382/115
8,489,399 B2 * 7/2013 Gross ...................... G10L 17/26
    370/259

(Continued)

FOREIGN PATENT DOCUMENTS

CN      1610294      4/2005
CN      101997689      3/2011

(Continued)

OTHER PUBLICATIONS

Office Action for CN Patent Application 201310068736.8, mailed Jun. 1, 2016, Alibaba Group Holding Ltd., "Method and System for Distinguishing Humans From Computers", 13 pages.

(Continued)

*Primary Examiner* — Carl Colin
*Assistant Examiner* — Gary Lavelle
(74) *Attorney, Agent, or Firm* — Lee & Hayes, PLLC

(57) ABSTRACT

A method and an apparatus for distinguishing humans from computers. During user registration, a computer prompts a human user to provide a spoken response to certain authentication information for registration. The computer obtains registration voice data from the spoken response and establishes a registration voiceprint of the human user. During user logon, the computer identifies the user requesting to logon by the user's logon credentials, provides authentication information for logon to the user, and prompts the user (Continued)

to provide a spoken response to the authentication information for logon. The computer obtains logon voice data from the spoken response, and establishes a logon voiceprint of the user. The computer then determines whether the user requesting to logon is human by comparing the logon voiceprint with the registration voiceprint.

19 Claims, 7 Drawing Sheets

(51) Int. Cl.
*G10L 25/48* (2013.01)
*G10L 25/69* (2013.01)
*G10L 25/51* (2013.01)
*G10L 15/00* (2013.01)
*G10L 17/22* (2013.01)
*G10L 15/06* (2013.01)
*G10L 15/26* (2006.01)
*G06F 3/16* (2006.01)
*G06Q 20/40* (2012.01)

(52) U.S. Cl.
CPC . *G06F 2221/2133* (2013.01); *G06Q 20/40145* (2013.01); *G10L 15/00* (2013.01); *G10L 15/063* (2013.01); *G10L 15/265* (2013.01); *G10L 17/22* (2013.01); *G10L 25/48* (2013.01); *G10L 25/51* (2013.01); *G10L 25/69* (2013.01); *G10L 2015/0631* (2013.01)

(56) References Cited

U.S. PATENT DOCUMENTS

| | | | |
|---|---|---|---|
| 2003/0037004 A1* | 2/2003 | Buffum | G06F 21/32 705/51 |
| 2004/0098481 A1* | 5/2004 | Gunji | G06F 21/32 709/225 |
| 2007/0150920 A1* | 6/2007 | Lee | H04H 20/82 725/54 |
| 2008/0141353 A1 | 6/2008 | Brown | |
| 2009/0309698 A1* | 12/2009 | Headley | G06F 21/316 340/5.52 |
| 2010/0119046 A1 | 5/2010 | Hoblit et al. | |
| 2011/0321149 A1 | 12/2011 | Tamir et al. | |
| 2012/0051525 A1 | 3/2012 | Gilbert | |
| 2013/0006626 A1 | 1/2013 | Aiyer et al. | |
| 2013/0013309 A1 | 1/2013 | Adibi | |
| 2013/0047232 A1 | 2/2013 | Tuchman et al. | |
| 2013/0060569 A1 | 3/2013 | Fu et al. | |
| 2013/0167212 A1* | 6/2013 | Azar | G06F 21/32 726/7 |
| 2013/0225128 A1 | 8/2013 | Gomar | |
| 2013/0339018 A1 | 12/2013 | Scheffer et al. | |
| 2013/0339455 A1 | 12/2013 | Bajaj et al. | |
| 2014/0259138 A1 | 9/2014 | Fu et al. | |

FOREIGN PATENT DOCUMENTS

| | | |
|---|---|---|
| CN | 102222502 | 10/2011 |
| CN | 102304996 | 1/2012 |
| CN | 102404287 | 4/2012 |

OTHER PUBLICATIONS

Office Action for U.S. Appl. No. 14/197,064, mailed on Mar. 27, 2015, Yingfang Fu, "Method and System for Distinguishing Humans From Machines", 29 pages.

PCT Search Report and Written Opinion mailed Jan. 22, 2015 for PCT Application No. PCT/US14/20423, 12 Pages.

* cited by examiner

METHOD AND SYSTEM FOR DISTINGUISHING HUMANS FROM MACHINES

RELATED PATENT APPLICATIONS

This application is a continuation of and claims priority to U.S. application Ser. No. 14/197,064, filed Mar. 4, 2014, entitled "METHOD AND SYSTEM FOR DISTINGUISHING HUMANS FROM MACHINES", issued on Feb. 9, 2016 as U.S. Pat. No. 9,258,302, which claims foreign priority to Chinese Patent Application No. 201310068736.8 filed on Mar. 5, 2013, entitled "METHOD AND SYSTEM FOR DISTINGUISHING HUMANS FROM MACHINES", Chinese Patent Application is hereby incorporated by reference in its entirety.

TECHNICAL FIELD

The present application relates to computer technologies, and more particularly to techniques for distinguishing humans from machines.

BACKGROUND

With the popularity of the Internet, various Web services are increasingly becoming part of everyday life, such as e-commerce, e-mail services, downloads and more resources, which are often free to access. However, these services intended for the human users are often abused or attacked by unauthorized users and malicious computer programs. These unauthorized activities take up service resources, generate a lot of Web junk and spamming, affect user experiences, and threatens the security of Web services.

Techniques exist for distinguishing humans from machines in order to reduce the attacks by machines word computers. An example of such techniques is CAPTCHA (Completely Automated Public Turing test to tell computers and humans apart), which is a security measure for authentication using challenge-response tests to tell a human from a computer. CAPTCHA uses a server computer to generate CAPTCHA challenges (tests) and to evaluate the responses. As a user intends to use a Web service which requires authentication, the server provides the user with a challenge (test); the user responses to the challenge by submitting the response to the server; and the server assesses whether the user has met the challenge according to the response.

The current CAPTCHA techniques primarily include text CAPTCHA, image CAPTCHA, and sound CAPTCHA. These techniques are based on different issues identified in the field of AI, and have different characteristics.

Text CAPTCHA takes advantage of the differences in human recognition of textual characters and machine recognition of the same, and uses verification codes to distinguish between human and machine. A verification code used in text CAPTCHA may be a distorted picture created using a string of numbers or symbols randomly generated. Interference pixels are often added to the distorted picture to prevent optical character recognition. A human user visually recognizes the verification code contained in the distorted picture, and submits the recognized verification code, and is allowed to use the service if the submitted verification code is correct. Examples of text CAPTCHA are the website of CSDN (Chinese Software Developer Network) which uses GIF format+numbers for user logon; website of QQ which uses randomly generated characters for website registration, and uses PNG format images with random numbers+random capital letters for logon; MSN and Hotmail which uses BMP format with random numbers+random capital letters+random interference for new account registration+random bits; Google Gmail which uses JPG format with random numbers+random colors+random lengths+random positions for new account registration; and certain large forums which adopted XBM format with random content.

Image CAPTCHA takes advantage of the differences between humans and machines in image classification, object identification, commonsense understanding and other aspects. Image CAPTCHA is usually independent of different languages, requires no user input text, and is harder to crack. One example of image CAPTCHA is CAPTCHA BONGO designed by Carnegie Mellon University which uses two types of visual model (such as lines, circles, boxes, etc.), and allows users to determine the type of the new model. However, the design of selecting one model out of the two options cannot guarantee safety. Another example is CAPTCHA using an annotated image database. A weakness of this algorithm lies in that once the database is leaked, the algorithm's security collapses. Google's What's Up app uses a CAPTCHA algorithm that is based on image orientation recognition. An image is rotated perpendicular to its original orientation. What's Up requires no image annotation. It continues to add candidate images during the tests, and uses user feedback to correct initial annotations. Furthermore, What's up has an automatic image orientation filter that is trained to detect and filter out images that are machine recognizable, and also detect and filter out images that are difficult for human recognition, to ensure that the test can be passed by most human users but not by machines. Compared with CAPTCHA based on the image classification, What's Up challenges the users with more difficult image-understanding questions and requires the user to analyze the content of the image. The technique enjoys a very large usable base of images which are not limited to specific items, and its automatic image annotation based on user feedback also results in less tedious human intervention.

Sound CAPTCHA takes advantage of the differences in human and machine speech recognition. The technique plays at random intervals one or more human-spoken numbers, letters or words, and adds background noise to resist ASR (Automatic Speech Recognition) attack. For example, in sound CAPTCHA BYAN-I and BYAN-II, the user is prompted to select a preferred language, while the computer randomly selects six numbers, generates a test audio accordingly, and adds another speaker's voice as background noise. The user is prompted to enter the six numbers correctly recognized in the audio. In BYAN-I, background noise is the same six numbers spoken in a different language, while in BYAN-II the background noise is the sound of random selected numbers or words.

The current mainstream CAPTCHA techniques, while being capable of avoiding some degree of malicious computer program abuse of Web services, are vulnerable to a variety of attacks and easy to crack, and result in poor user experiences.

More specifically, although text CAPTCHA that distorts the text does to a degree prevent a malicious computer program from registering or logging on, the advancements in character segmentation and optical character recognition (OCR) have cracked most text CAPTCHA algorithms. CAPTCHA algorithms based on simple character recognition challenges are no longer able to stop computer programs. Besides, distorted text images are difficult to be recognized by humans, and result in poor user experience.

Image CAPTCHA takes advantage of the differences between humans and machines in image classification, object identification, commonsense understanding and other aspects. This technique is usually independent of different languages, requires no user input text, and more difficult to crack than text CAPTCHA. However, image CAPTCHA requires extensive database support, is difficult to be produced in large scale, and is further vulnerable to attacks by machine learning algorithms. For example, Golle designed an SVM (Support Vector Machine) classifier which combines colors and texture features to classify images of cats and dogs, and achieved 82.7% success rate on single images and a success rate up to 10.3% on Asirra which contains 12 graphs.

Sound CAPTCHA is equally susceptible to attacks by machine learning algorithms. Tam et al. uses a fixed-length audio search window to identify energy peaks for recognition, and extracts three kinds of audio features therefrom, namely Mel-Frequency Cepstral Coefficient, Perceptual Linear Prediction, Correlation Spectral Inversion Perceptual Linear Prediction, and uses three machine learning algorithms (AdaBoost, SVM, and k-NN) to train. The method achieved success rates of 67%, 71% and 45% on Google, Digg and ReCAPTCHA, respectively. Similar methods were also used to crack eBay's voice CAPTCHA, achieving a success rate up to 75%.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure provides a method and an apparatus for distinguishing humans from machines. During user registration, a computer prompts a human user to provide a spoken response to certain authentication information for registration. The computer obtains registration voice data from the spoken response and establishes a registration voiceprint of the human user. During subsequent user logon verification, the computer identifies a user requesting to logon by the user's logon credentials, and provides selected authentication information for logon to the user, who is prompted to provide a spoken response to the authentication information for logon. The computer obtains logon voice data from the spoken response, and establishes a logon voiceprint of the user. The computer then determines whether the user requesting to logon is human by comparing the logon voiceprint with the registration voiceprint.

The authentication information for logon may include at least some of the authentication information for registration. For example, the authentication information for logon may be a subset of the authentication information for registration.

In some embodiments, the computer generates a set of n first kind elements, where n is an integer, and creates a set of T second kind elements, where each second kind element is one of r-permutations of the n first kind elements, r is an integer and r<n, and T≤R, where R is the total number of r-permutations of the n first kind elements. The computer then provides the set of T second kind elements as the authentication information for registration to the human user. T, r, R are all integers.

The n first kind elements may be generated randomly. In one embodiment, each first kind element includes an alphanumerical character.

The computer may then provide a subset of the set of T second kind elements as the authentication information for logon to the user requesting to logon, where the subset has t second kind elements, t≤T.

In a similar embodiment, the computer may create a set of C third kind elements, and provide at least one element of the set of C third kind element as the authentication information for logon to the human user. Each third kind element is a subset of the set of T second kind elements, and the subset has t second kind elements, t≤T.

The spoken response to the authentication information for registration may include reading aloud at least part of the authentication information for registration. The spoken response to the authentication information for logon may include reading aloud at least part of the authentication information for logon.

In some embodiments, the authentication information for registration includes a question, and the spoken response to the authentication information for registration includes reading aloud an answer to the question; the authentication information for logon includes the same question, and the spoken response to the authentication information for logon includes reading aloud the answer to the same question.

Alternatively, the authentication information for registration may include a plurality of questions, while the spoken response to the authentication information for registration may include reading aloud a respective answer to each of the plurality of questions; and the authentication information for logon includes a question randomly selected from the plurality of questions, and the spoken response to the authentication information for logon includes reading aloud the respective answer to the question randomly selected from the plurality of questions.

According to another aspect of the method, the computer registers a set of logon credentials of a human user, provides authentication information for registration to the human user, and prompts the human user to provide a spoken response to the authentication information for registration. The computer obtains registration voice data from the spoken response, and establishes a registration voiceprint of the human user based on the obtained registration voice data. The computer further identifies a user requesting to logon by matching a set of logon credentials received from the user with the registered logon credentials of the human user, and provides authentication information for logon to the user requesting to logon. The authentication information for logon is determined based on the authentication information for registration of the human user identified by the logon credentials. The user requesting to logon is prompted to provide a spoken response to the authentication information for logon. The computer obtains logon voice data from the spoken response, establishes a logon voiceprint of the user requesting to logon based on the obtained logon voice data, and determines whether the user requesting to logon is human by comparing the logon voiceprint with the registration voiceprint.

Another aspect of this disclosure is a computer-based apparatus for distinguishing humans from machines. The apparatus includes a computer having a processor, computer-readable memory and storage medium, and I/O devices, where the computer is programmed to perform functions including:

providing authentication information for registration to a human user requesting for registration, wherein the human user is prompted to provide a spoken response to the authentication information for registration;

obtaining registration voice data from the spoken response to the authentication information for registration;

establishing a registration voiceprint of the human user based on the obtained registration voice data;

providing authentication information for logon to a user requesting to logon, wherein the user requesting to logon is prompted to provide a spoken response to the authentication information for logon;

obtaining logon voice data from the spoken response to the authentication information for logon;

establishing a logon voiceprint of the user requesting to logon based on the received logon voice data; and determining whether the user requesting to logon is human by comparing the logon voiceprint with the registration voiceprint.

The apparatus may be further programmed to authenticate the logon request of the user requesting to logon by identifying the user as the registered human user using logon credentials such as a user identification and a password.

Some of the embodiments use a CAPTCHA scheme based on a voice verification code plus voiceprint recognition method. Compared with the existing CAPTCHA techniques (text, images, sound CAPTCHA technologies), the new scheme is more difficult to crack, and therefore helpful to avoid unauthorized users and malicious computer programs of using Web services, yet at the same time easy to use by the users and therefore helpful to improve the user experience.

The disclosed techniques may further use dynamic verification codes, and use voiceprint recognition to verify the text portion of the dynamic verification codes. This improves both reliability and latency. Another optimized embodiment combines voiceprint recognition and hand-entered password to ensure the privacy of information, and at the same time also improve the system performance, and improve the safety, performance, and user experience of Web services. In comparison, the existing techniques use simple hand-entered passwords and hand-entered authentication codes. The passwords are easy to forget, vulnerable to password interception and counterfeit attacks, and the authentication codes are easy to crack, making the system vulnerable to Web service abuse.

The present disclosure also introduces an optimized method to control the CAPTCHA function, to screen out the anomalies, and to identify unauthorized users or malicious computer programs. This method is optimized to combine password authentication, voiceprint recognition, human-machine recognition under the principle of separation of powers, each branch checking on other branches while maintaining independence from one another, to prevent a single point of failure and internal attacks. Another aspect of the optimization involves deploying the CAPTCHA function as either centralized or distributed services on the router system, such that one can better control at the network edge the abuse of the Web service resources by malicious programs. The centralized model and the distributed model each has its own advantages and may be balanced by mixing the aspects of two models. The centralized deployment at a router facilitates centralized management on the router, while the distributed deployment on various edge routers enables management using a distributed load balancing algorithm to prevent a single point of failure attack, and improve Web service system performance.

Other features of the present disclosure and advantages will be set forth in the following description, and in part will become apparent from the description, or understood by practice of the application. Purposes of this application and other advantages can be obtained by the written description, claims, and drawings of the structure particularly pointed out realized and attained.

DETAILED DESCRIPTION

In order to facilitate understanding of the above purpose, characteristic and advantages of the present disclosure, the present disclosure is described in further detail in conjunction with accompanying figures and example embodiments. In the description, the term "technique(s)," for instance, may refer to method, apparatus device, system, and/or computer-readable instructions as permitted by the context above and throughout the present disclosure.

In this description, the order in which a process is described is not intended to be construed as a limitation, and any number of the described process blocks may be combined in any order to implement the method, or an alternate method. An embodiment is described in sequential steps only for the convenience of illustration. Further, not every step described in the embodiments is required by the method.

Figure 1:
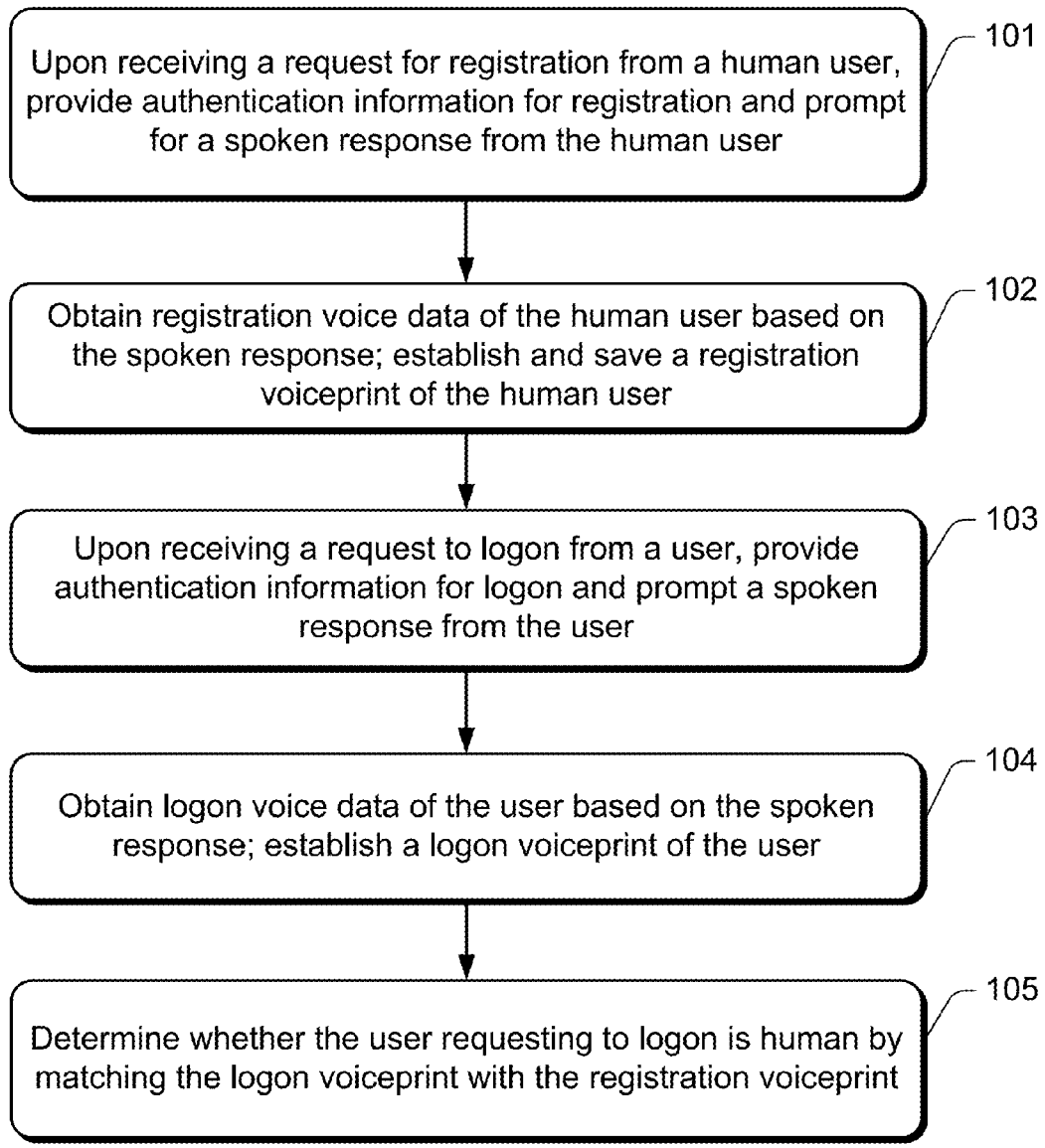
FIG. 1 is a schematic flow of an embodiment of the method for distinguishing humans from machines in accordance with the present disclosure.

FIG. 1 is a schematic flow of an embodiment of the method for distinguishing humans from machines in accordance with the present disclosure. The method is implemented on a network service-providing system which is accessed by multiple users. The method helps the system to distinguish human users from machines programmed to gain unauthorized access to the system. The method uses a computer (or a system of computers) to carry out a process that is described in blocks as follows.

At block 101, upon receiving a request for registration from a human user, the computer provides authentication information for registration, and prompts for a spoken response to the authentication information from the human user.

At block 102, the computer obtains registration voice data of the human user from the spoken response of the human user, establishes a registration voiceprint of the human user and saves the voiceprint.

At block 103, upon subsequently receiving a request to logon from a user, the computer provides authentication information for logon which prompts a spoken response from the user.

At block 104, the computer obtains logon voice data of the user from the spoken response, and establishes a logon voiceprint of the user.

At block 105, the computer determines whether the user requesting to logon is human by comparing the logon voiceprint with the registration voiceprint.

Blocks 101 and 102 are part of a user registration process in which a legitimate human user registers for access to a Web service. The registration obtains, in addition to ordinary user information usually provided for user registration, a voice data of the human user as the human user responds to certain verification information provided by the computer.

Blocks 103, 104 and 105 are part of a user logon verification process in which a human-machine recognition process is used for distinguishing a human user from a machine. For any user who attempts to logon to access the Web service, the computer obtains a voice data from user from the user's spoken response to a authentication information for logon provided to the user, and establishes a voiceprint for the user. The computer then compares the voiceprint or of the user with the registered (stored) voiceprint of the human user to determine whether the user is a human user.

In one embodiment, the registered account of the human user is identified with the user attempting to logon through user identification information such as a username, and as a result the authentication information for logon is derived from the authentication information for registration of the same user.

The method combines voiceprint recognition technology with human-machine recognition to improve reliability and accuracy. Voiceprint recognition is a type of biometric recognition technology. Voiceprint recognition automatically determines the physiological and behavioral characteristics of the speaker based on the speaker's voice parameters extracted from speech waveforms, and in some applications may be able to recognize the identity of the speaker based on the determined characteristics. Every person, no matter how closely the person can imitate others, has a unique voiceprint, which is determined by the person's vocal organs formed in the growth process.

In one embodiment, the authentication information for registration and authentication information for logon may be rendered in the form of text or an image. Thanks to the layer of voice authentication protection, the authentication information itself may be safely presented without distortion, such as plain characters (e.g., numbers or letters), and can be easily read by the user. This can improve the user experience. However, if desirable, the authentication information for registration and/or logon may be distorted or mixed with interference pixels.

To facilitate a more accurate comparison between the logon voiceprint and the registration voiceprint, the authentication information for logon may include at least some information of the authentication information for registration. In one embodiment, the authentication information for logon is a subset of the authentication information for registration.

Both text-independent voice recognition and text-related voiceprint recognition may be used. With text-independent voiceprint recognition, the text in authentication information for registration and the text in authentication information for logon may be arbitrarily different or independent from one another. In contrast, with text-related voiceprint recognition, the relevant text in authentication information for registration and the relevant text in authentication information for logon need to be identical, or at least share a meaningful part which is used for comparison and matching of the voiceprints.

The pure text-independent voiceprint recognition tends to have worse latency performance than simple hand-input verification code and text-related voiceprint recognition, and may lead to poor user experience. On the other hand, pure text-related voiceprint recognition may be more vulnerable to attacks due to its lack of variations.

In some embodiments, the authentication information for logon has a dynamic text or a dynamic code, which is changeable from one logon to another even for the same user, and is not identical to the registered authentication information. On the other hand, the authentication information for logon is a subset of the registered authentication information such that text-related voiceprint recognition can be used for more relevant and more accurate voiceprint recognition, comparison and matching. This combination optimally balances the latency performance and the reliability of human-machine recognition.

In one embodiment, the authentication information for logon is made of any combination and/or permutation of the elements contained in the authentication information for registration. An example of such combination is described as follows.

Permutation definition: "r-permutations of n different elements" is defined as all possible arrangements of r nonrepeating elements taken from the set of n different elements, and arranged in their order. The number of all r-permutations of the n different element is denoted by P (n, r):

$$P_n^r = n(n-1) \ldots (n-r+1).$$

Combination definition: "r-combinations of n different elements" is defined as all possible arrangements of r nonrepeating elements taken from the set of n different elements, and arranged without consideration of any order of the elements. The number of all r-combinations of the n different element is denoted by C (n, r):

$$C_n^r = \frac{P_n^r}{r!} = \frac{n!}{r!(n-r)!}.$$

The above n and r are both positive integers, and r is less than or equal to n (r≤n).

In this embodiment, the authentication information for registration is provided as follows:

The computer first randomly generates n different first kind elements which each has a number or character. The authentication information for registration is based on the set of r-permutations of n different first kind elements. The elements of the set are a second kind elements each being an r-permutation of n different first kind elements. Let R denote the total number of elements (the second kind elements) in the set which is used as the authentication information for registration. The maximum value of R the total number of r-permutations of n different first kind elements and can be computed as:

$$R = P_n^r = n(n-1) \ldots (n-r+1).$$

Alternatively, any subset of T(T≤R) second kind elements selected from the above set may be provided as the authentication information for registration.

The authentication information for logon is dynamically and randomly taken from the authentication information for registration, which is based on the set or a subset of r-permutations of n different first kind elements.

Specifically, the authentication information for logon is taken from a new set or a subset of t-combinations of R different second kind elements defined herein. The elements of the new set or the subset are a third kind elements each being a t-combination of R different second kind elements. The maximum number of the third kind elements is C, which can be computed as $$C = C_R^t = \frac{R!}{t!(R-t)!}.$$

The above n, r, t, R are positive integers, wherein r is less than or equal to n (r≤n); and t is less than or equal to R (t≤R), R being the total number of elements (the second kind elements) in the set or the subset for the authentication information for registration.

A specific example:

During user registration, the computer randomly generates four (n=4) alphanumerical characters (four first kind elements). Taking two (r=2) non-repeating first kind elements and arrange them in their order results in a set of 12 (R=12) second kind elements. This set or a subset thereof forms the basis for authentication information to be registered (i.e., authentication information for registration).

During logon verification, take three (t=3) second kind elements from the set or the subset of the registered authentication information, and use the combination of the three second kind elements as the authentication information for logon.

The specific process is as follows:

(A) Generating the authentication information for registration

The computer randomly generates four characters (i.e., n=4): 6, a, 9, k, which are the four first kind elements.

From the above four first kind elements, the computer takes two non-repetitive elements and a range them in their order to obtain a set of R second kind elements:

$$R = P_4^2 = 4 \times 3 = 12.$$

Specific second kind elements of the set up tent above are:
{(6a), (69), (6k), (a6), (a9), (ak), (96), (9a), (9k), (k6), (ka), (k9)}.

The entire set, or a subset thereof, may be taken as the basis for the authentication information for registration.

Assume here the entire set is taken, so the authentication information for registration includes the above whole set of twelve second kind elements (each being a two-element permutation of the four first kind elements), and the authentication information for registration is provided (e.g., displayed) to the user who is registering an account, as follows:
6a, 69, 6k, a6, a9, ak, 96, 9a, 9k, k6, ka, k9.

The user is prompted to read aloud the displayed alphanumerical information. Alternatively, any subset of T (T≤12) second kind elements selected from the above set may be provided as the authentication information for registration. The whole set or a larger subset offers better security and selectivity, but is more cumbersome for the user to register the voice data by speaking aloud all the information provided in the set for the subset. In practice, a balance may be struck based on needs.

(B) Generating the authentication information for logon

In a subsequent logon process requested by a user, one or more combinations of three second kind elements (i.e., t=3) selected from the above twelve second kind elements is taken as the authentication information for logon and displayed to the user. Here t=3 is only an exemplary choice. Any other member not greater than T may be used.

Assume the entire set of above 12 second kind elements are taken to be the authentication information for registration (i.e., T=12), and if the order in the combinations is not considered, the set of three-element combinations out of the twelve second kind elements result in a set of 220 third kind elements, where each third kind element is a three-element combination of the second kind elements.

The number of the third kind elements in the set is computed as follows:

$$C = C_{12}^3 = \frac{12!}{3!9!} = 220.$$

Specific third kind elements in the set are: {[(6a), (69), (6k)], [(a6), (a9), (ak)], [(96), (9a), (9k)] . . . [(k6), (ka), (k9)]}, where each third kind element (e.g., [(6a), (69), (6k)]) is a three-element combination of the second kind elements.

The authentication information for logon is formed using this set or a subset thereof. More specifically, the authentication information for logon can be one or more third kind elements selected from the above set or a subset thereof. For example, if just one element [(a6), (a9), (ak)] is selected, the information of this selected element constitutes the authentication information for logon, and is provided (e.g., displayed) to the user who is trying to logon. The user is prompted to read aloud the displayed alphanumerical information.

In an alternative embodiment, the authentication information is based on questions and answers instead of alphanumerical characters. For example, the computer may randomly select from a question bank a number of questions and provide them to the user during registration, and require the user to speak answers to all the questions that are provided to the user. During logon, the computer randomly selects one or more questions from the registered questions, and provides the selected question to the user for a spoken answer.

A specific example:

During user registration, the computer randomly selects four questions from the question bank, and provides them as the authentication information for registration to be answered by the user who registers. During user logon, the computer randomly selects one question from the registered four questions, and provides the question as the authentication information for logon to be answered by the user who attempts to logon. The process is illustrated as follows:

(A) Generating the authentication information for registration

The computer provides these questions for registration: What is your favorite sports? Who is your favorite person? What is your favorite animal? Which college did you attend? The user requesting for registration is prompted to provide a spoken answer to each of the four questions provided by the computer.

(B) Generating the Authentication Information for Logon

The computer provides one question for logon: What is your favorite animal? The user attempting to logon is prompted to provide a spoken answer to the question provided by the computer.

The method described herein takes advantage of some essential differences between how a human thinks and how a computer "thinks". Although a computer imitates how a human thinks, it lacks human sentiments, imagination, conjectures, and other mental activities. It further lacks the social aspects and creativity of a human being. The present disclosure changes the prior art hand-input verification codes to dynamic verification codes, and further introduces voice input of the related spoken texts of the dynamic verification codes, to bring about certain dynamic elements of human behavior and biometric characteristics of a human user, and make it easier to distinguish a human from a machine.

The human-machine recognition aspect (i.e., the function to distinguish humans from machines) of the method described herein may be used in conjunction with traditional logon credentials such as username and password. In one embodiment, the computer establishes a user identification of the human user during registration, and subsequently receives logon user identification information from the user requesting to logon. Before comparing the logon voiceprint with the registration voiceprint, the computer identifies the user requesting to logon by matching the received logon user identification information with the registered user identification of the human user. The user identity, although tentative before authentication, helps link the received authentication information for logon to the saved authentication information for registration, and such link provides a basis for applying text-related voiceprint recognition.

Furthermore, the computer may establish a password of the human user during registration, and subsequently receive logon password from the user requesting to logon. If the user requesting to logon is determined to be human using human-machine recognition described herein, the computer then verifies that the user requesting to logon is the registered user by matching the received logon password with the registered password.

Although in principle, the human-machine recognition process described herein is capable of identifying and authenticating a user without assistance of other logon credentials (such as hand-input password), it is desirable that such logon credentials be used together with human-machine recognition. For example, hand-input passwords offer higher level of privacy. It may not be advisable to read aloud such passwords in public places. In addition, authenticating a hand-input password suffers less latency problem than voiceprint recognition, especially if the voiceprint recognition is required to be sophisticated enough and independent enough to be capable of performing complete identification and authentication without further assistance. Also, a lost hand-input password can be easily retrieved or reset using the e-mail address or mobile phone number, while voiceprint would require another registration process.

Figure 2:
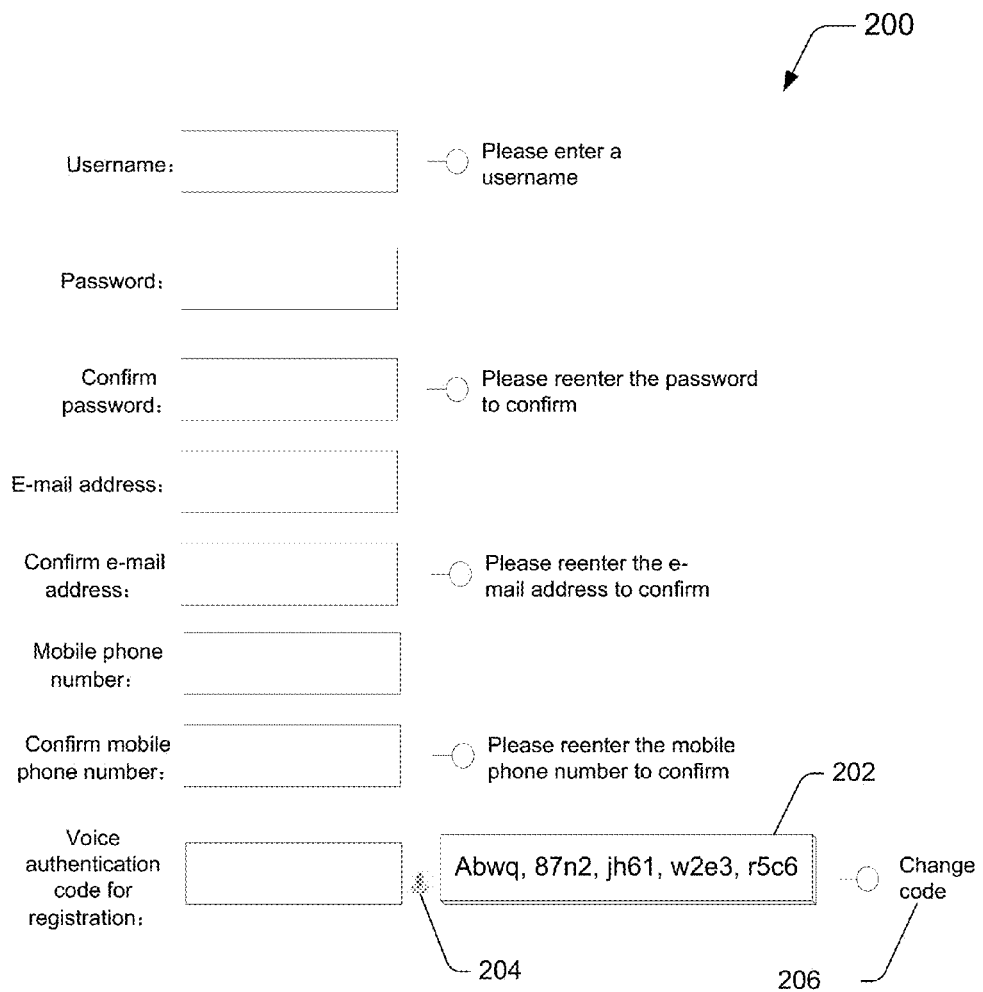
FIG. 2 is an example of a user interface for registration used in the method of the present disclosure.

FIG. 2 is an example of a user interface for registration used in the method of the present disclosure. As shown in FIG. 2, the user registration process 200 requires the user to establish a username and a traditional password, and also register a voice-input of an authentication code 202 (which is a specific example of authentication information for registration described herein). A microphone switch 204 (or indicator) is provided to allow the user to turn on the microphone to read aloud the displayed authentication code 202. The microphone may also be automatically activated. A code change option 206 is also provided for the user to request another authentication code to be registered with voice-input.

Alternatively, instead of using authentication code 202 which prompts a direct readout by the user, an authentication question may be displayed in its place and prompts a voice answer by the user.

The computer establishes a registration voiceprint for the user based on the voice input entered by the user during registration, and saves the registration voiceprint for subsequent human-machine recognition in a logon process as described herein.

Figure 3:
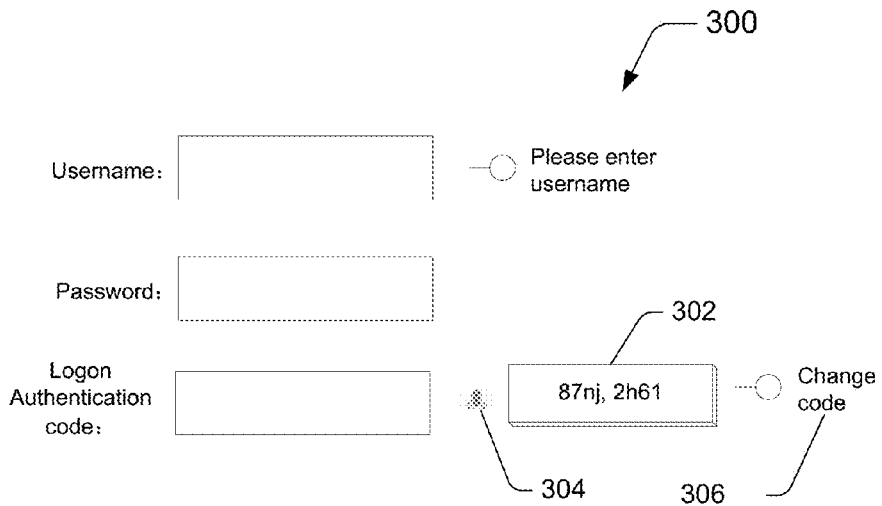
FIG. 3 is an example of user interface for logon used in the method of the present disclosure.

FIG. 3 is an example of user interface for logon used in the method of the present disclosure. As shown in FIG. 3, the user logon process 300 requires the user to enter a username and a traditional password, and to also voice-input a logon authentication code 302 (which is a specific example of authentication information for logon described herein). In the illustrated example, the logon authentication code 302 is a combination of two elements of the five registered elements of the registration authentication code 202. A microphone switch 304 (or indicator) is provided to allow the user to turn on the microphone to read aloud the displayed logon authentication code 302. The microphone may also be automatically activated. A code change option 306 is also provided for the user to request another logon authentication code to be entered with voice-input. The logon voiceprint of the user is extracted from the voice input of the logon authentication code 302, and compared with the registered voiceprint of the user to determine if the user requesting logon is human. In combination of the username and the password, the logon user may be further identified and authenticated to be the registered user.

If the logon authentication code 304 entered by the user requesting logon fails to yield a logon voiceprint that matches the registered voiceprint of the identified user, the computer may reject the logon request. Even if the logon authentication code 304 is successful, the computer would still reject the logon request if the password entered by the user fails to match the registered password. The computer may further take steps of quarantine or alarming if it detects a malicious practice such as a rogue machine.

As an additional security measure, the computer may limit the number of logon attempts by the same user or from the same device within a prescribed period of time. A threshold may be preset for this purpose. The computer counts the number of logon attempts by the same user or from the same device. If the total number of failed logon attempts within the prescribed period of time has reached the preset threshold, the computer may reject any additional logon attempts by the same user or from the same device. If the computer detects a certain pattern that indicates a suspicious rogue machine, the machine may be put on a blacklist. This security measure may be performed after receiving a logon request but before performing human-machine recognition, and the computer would only take steps to determine whether the user requesting to logon is human if the threshold has not reached by the same user or from same device.

The threshold value and length of the prescribed period time made be set based on empirical data or test data, such that incidences where the network problems cause repeated logon tries are not counted toward the threshold.

Figure 4:
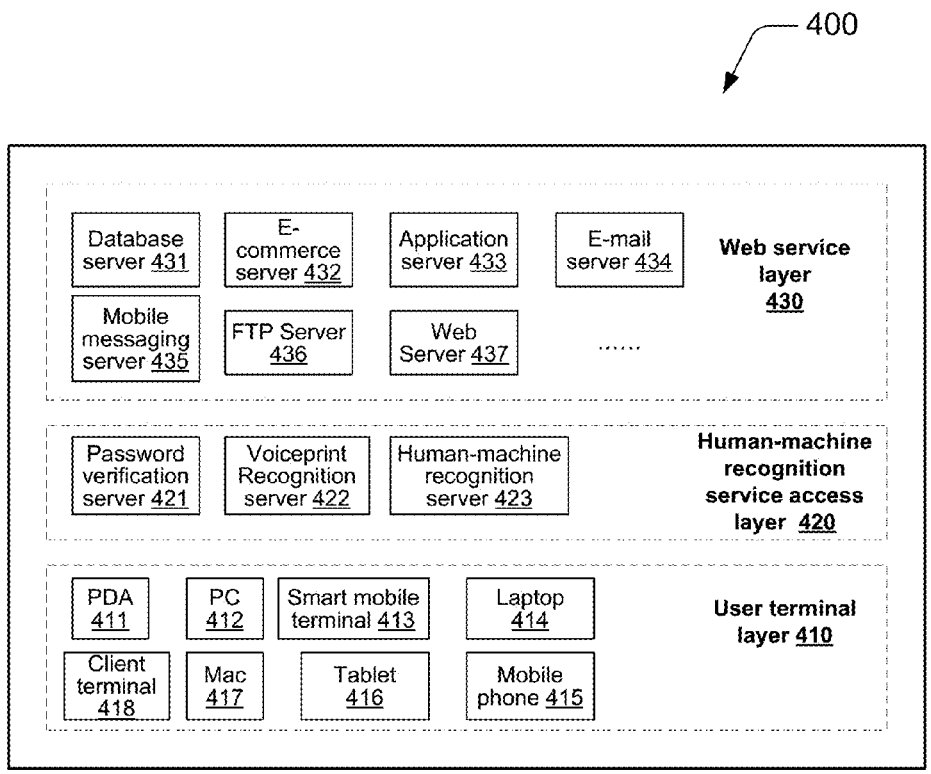
FIG. 4 is a schematic diagram of a system implementing the method for distinguishing humans from machines.

FIG. 4 is a schematic diagram of a system implementing the method for distinguishing humans from machines. The system 400 has an architecture that includes three layers.

User terminal layer 410 includes one or more user terminals with a voice communication device. Examples of the user terminal device are PDA 411, desktop PC 412, smart mobile terminal 413, laptop computer 414, mobile phone 415, tablet 416, MAC computer 417, and generic client terminal 418. The user accesses the Web services through one of these user terminals.

Human-machine recognition service access layer 420 includes one or more password verification servers 421 responsible for identifying the user and verifying the password of the user, one or more voiceprint recognition servers 422 responsible for building and recognizing the voiceprint of the user, and one or more human-machine recognition assessment and control server 423 responsible for assessing human and machine activities, distinguishing a human user from a machine, and controlling who can access the Web services. The password verification server 421, the voiceprint recognition server 422 and the human-machine recognition assessment and control server 423 together manage users and the user accesses to the Web services according to the principle of "separation of powers" with the servers sharing mutual supervision while maintaining independence from one another.

For example, a logon request from a user client terminal is evaluated by the human-machine recognition assessment and control server 423 to determine whether the request is a valid or legitimate. The logon request is verified by the password verification server 421 and authenticated by voiceprint recognition server 422. Only when the logon request passes the tests of all three servers can it be granted access to the Web service. At the same time, the result of the human-machine recognition assessment and control server 423 is not completely isolated but is affected and supervised by the password verification server 421 and the voiceprint recognition server 422, and vice versa.

Web service layer 430 includes one or more Web services to provide different server resources, including but not limited to, the following or any combination of: database server 431, e-commerce server 432, application server 433, e-mail server, mobile messaging server 435, FTP server 436, and Web server 437.

To access a web service that requires authentication, a user (or its client terminal) must pass the password verification, authentication by voiceprint recognition, and approved by human-machine recognition assessment.

However, the above functions to not have to be carried out by dedicated servers such as password verification server 421, voiceprint recognition server 422, and human-machine recognition assessment and control server 423. Instead, some functions may be implemented on routers in the network, as shown below.

Figure 5:
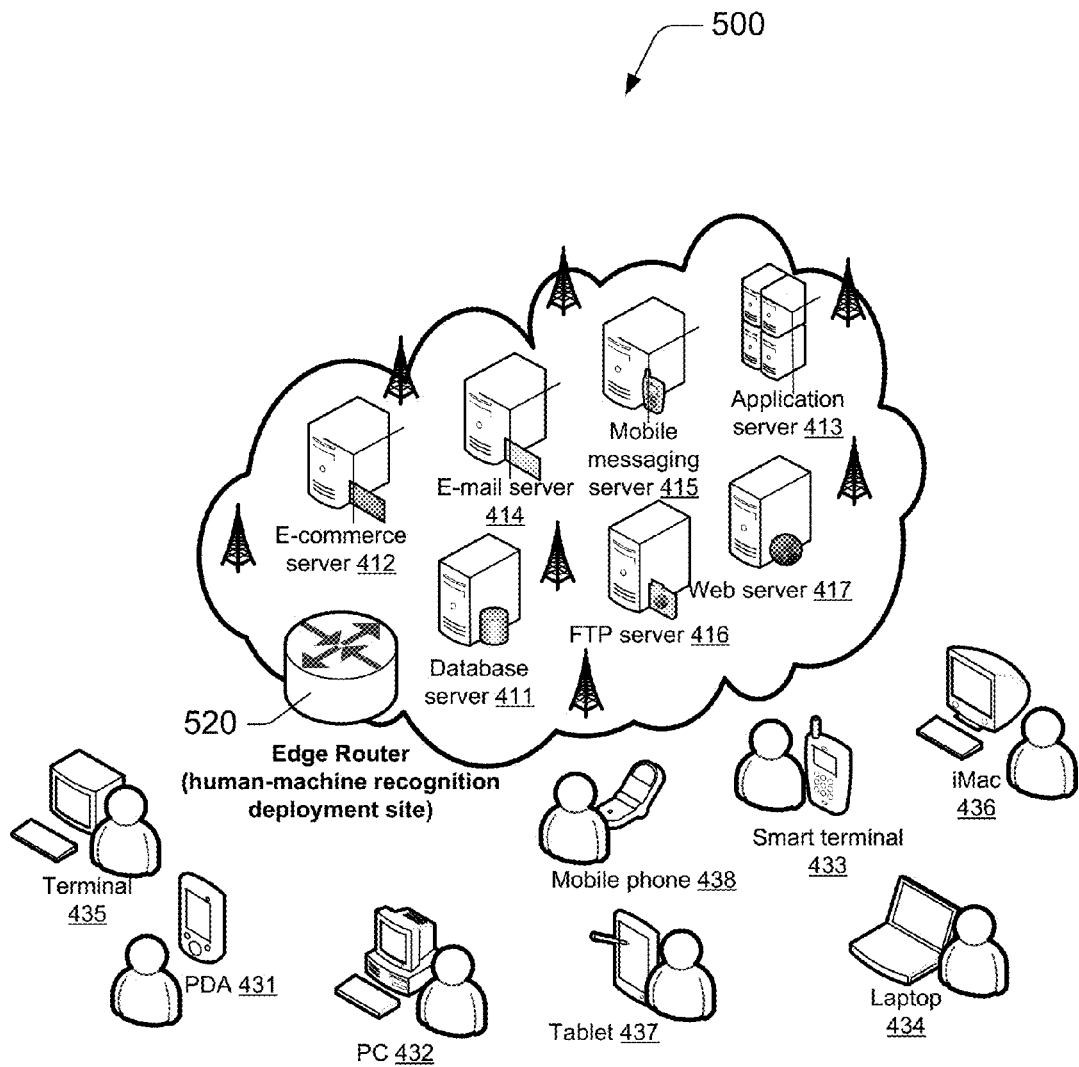
FIG. 5 is a schematic diagram of a centralized deployment of human-machine recognition services on an edge router.

FIG. 5 is a schematic diagram of a centralized deployment of human-machine recognition services on an edge router. In system 500, the human-machine recognition function is centrally deployed at an edge router 520 instead of a dedicated server. System 500 is similar to system 400 in other respects.

Figure 6:
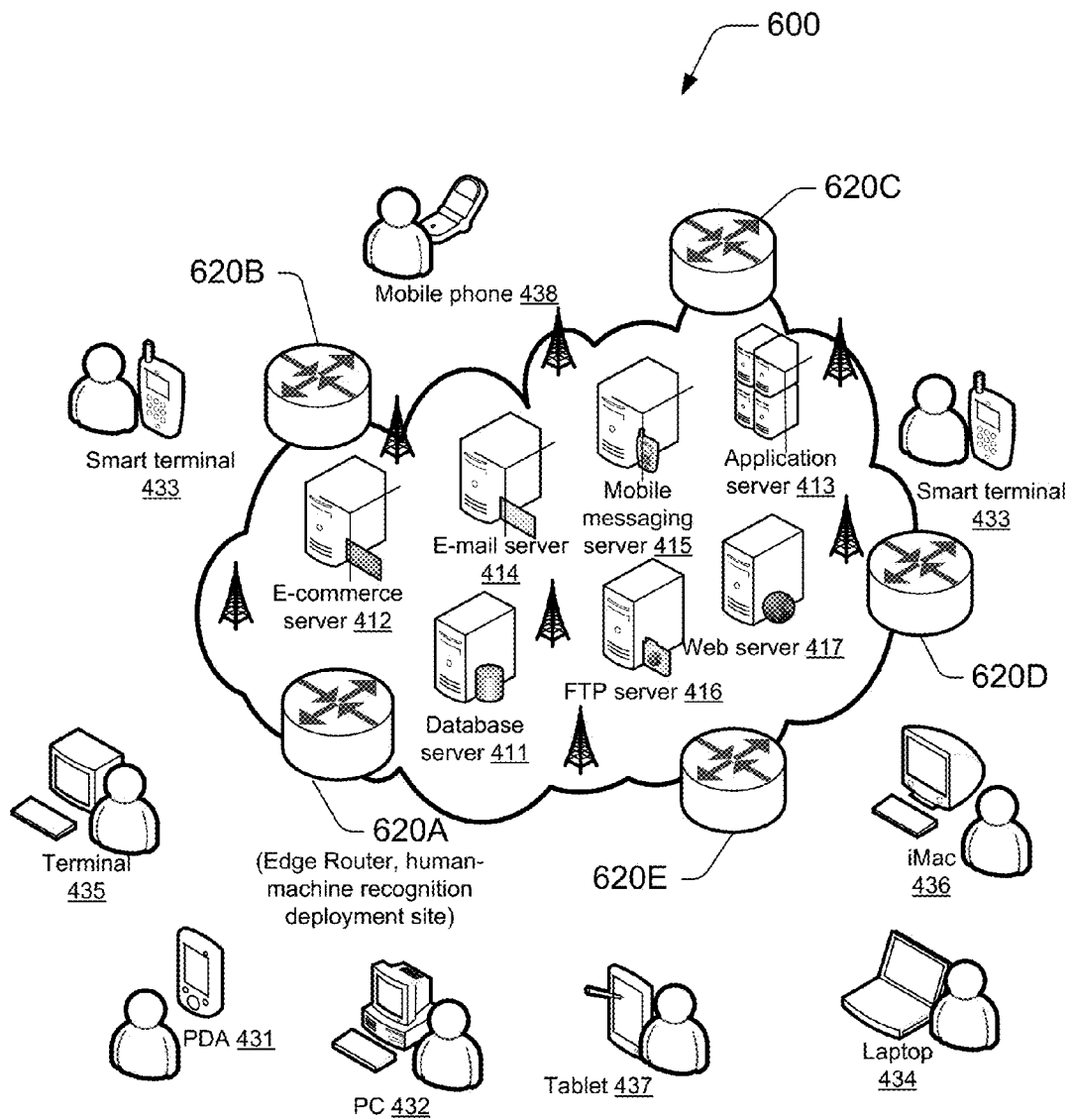
FIG. 6 is a schematic diagram of a distributed deployment of human identification services on the edge router.

FIG. 6 is a schematic diagram of a distributed deployment of human identification services on the edge router. In system 500, the human-machine recognition function is distributedly deployed at multiple edge routers 620A, 620B, 620C, 620D, and 620E, instead of a dedicated server. System 600 is similar to system 400 and system 500 in other respects.

Centralized deployment of FIG. 5 is easier to manage, but distributed deployment of FIG. 6 has the benefit of distributing management based on load balancing algorithms to prevent a single point of failure attack, and thus may improve Web service system performance.

The above-described techniques may be implemented with the help of one or more non-transitory computer-readable media containing computer-executable instructions. The non-transitory computer-executable instructions enable a computer processor to perform actions in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

In connection to the method disclosed herein, the present disclosure also provides a computer-based apparatus for implementing the method described herein.

In the presence disclosure, a "module" in general refers to a functionality designed to perform a particular task or function. A module can be a piece of hardware, software, a plan or scheme, or a combination thereof, for effectuating a purpose associated with the particular task or function. In addition, delineation of separate modules does not necessarily suggest that physically separate devices are used. Instead, the delineation may be only functional, and the functions of several modules may be performed by a single combined device or component. When used in a computer-based system, regular computer components such as a processor, a storage and memory may be programmed to function as one or more modules to perform the various respective functions.

Figure 7:
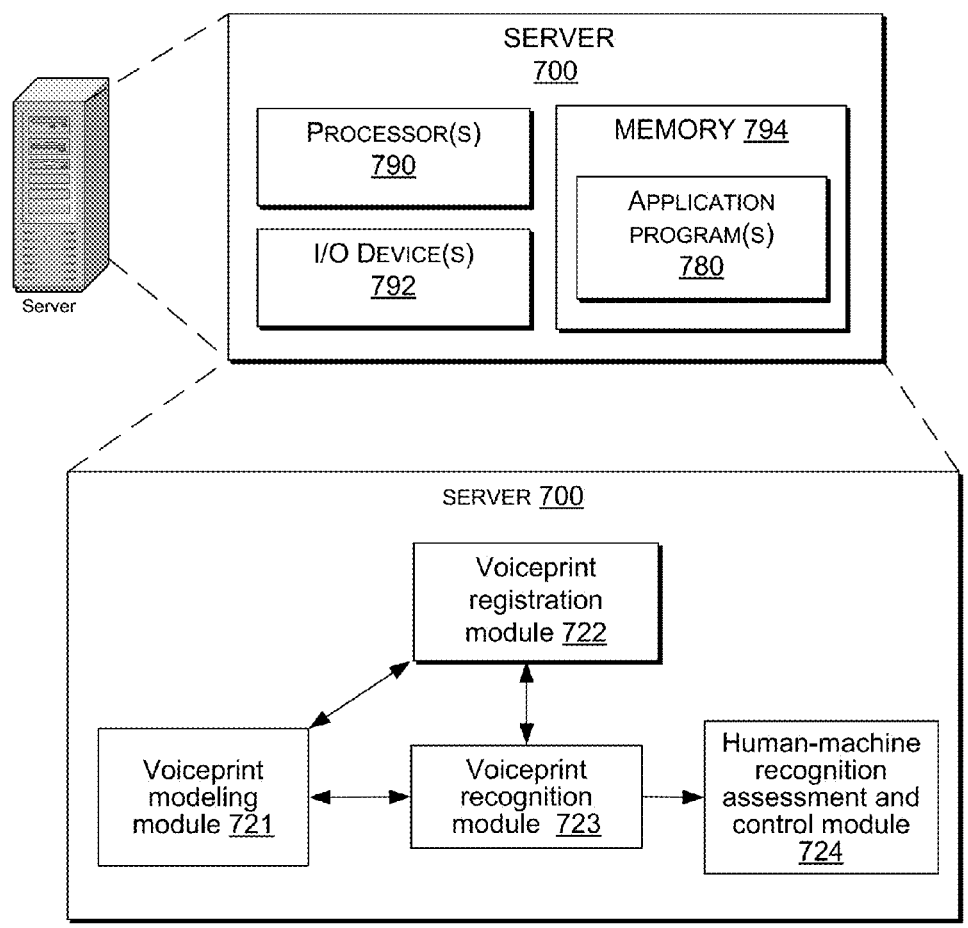
FIG. 7 is a schematic diagram of an implementation of a human-machine recognition system based on voiceprint recognition.

FIG. 7 is a schematic diagram of an implementation of a human-machine recognition system based on voiceprint recognition. The computer-based apparatus includes server 700 which has one or more processor(s) 790, I/O devices 792, memory 794 which stores application program(s) 780. The server 700 is programmed to have the functional modules as described in the following.

Voiceprint modeling module 721 is programmed to model voiceprint features using a suitable modeling algorithm.

Voiceprint registration module 722 is programmed to, upon receiving a registration request of a user, provide authentication information for registration and prompt the user to provide a spoken response to the authentication information received, and obtain voice data of the user contained in the spoken response. The voiceprint registration module 722 may also be programmed to instruct the voiceprint modeling module 721 to establish a registration voiceprint (a voice feature model) based on the received voice data.

Voiceprint recognition module 723 is programmed to, upon receiving a logon request of a user, provide authentic information for logon and prompt the user to provide a spoken response to the authentication information received; to receive voice data of the user contained in the spoken response, and instruct the voiceprint modeling module 721 to establish a logon voiceprint based on the received voice data; and to compare the logon voiceprint with the saved registration voiceprint.

Human-machine recognition assessment and control module 724 is programmed determine whether the user requesting the logon is human based on the result of comparing the logon voiceprint with the saved registration voiceprint, and optionally further determine whether the user requesting the logon is the same as the registered user.

The authentication information for logon may be a subset of the authentication information for registration to the enable dynamic authentication codes and text-related voiceprint recognition.

In some embodiments, voiceprint registration module 722 randomly generates n distinct first kind elements each including an alphanumerical character, forms r-permutations of n first kind elements by taking r non-repeating elements from the n distinct elements, and arrange them in their order, where r is an integer and r≤n. This results in a set of R second kind elements, wherein R is the total number of r-permutations of the n first kind elements, and each second kind element is one of r-permutations of the n first kind elements.

The voiceprint registration module 722 further selects a subset of the above set of R second kind elements, namely a set of Tsecond kind elements, where T R, takes the set of T second kind elements and provides them as the voice authentication information for registration to the user. In some embodiments, the voice authentication information is provided as a set of authentication codes based on the selected second kind elements.

The voiceprint recognition module 723 provides a subset of the set of T second kind elements as the voice authentication information for logon to the user requesting to logon, where the subset has t second kind elements, t≤T.

Alternatively, the voiceprint recognition module 723 creates a set of C third kind elements, and provides at least one element of the set of C third kind element as the voice authentication information for logon to the common user, where each third kind element is a subset of the set of T second kind elements, the subset having t second kind elements, t≤T. The selection of the at least one element to be provided as the voice authentication information for logon may be made randomly.

The above n, r, t, R, T, C are positive integers.

In another embodiment, the voiceprint registration module 722 randomly selects a number of questions from a library of questions, provides the selected questions to the user, and prompts the user to provide a spoken answer to each provided question. This is done during registration of the user.

Subsequently, when the user attempts to log on, the voiceprint recognition module 723 randomly selects a question from the multiple questions provided during registration, provides the selected question to the user, and prompts the user to provide a spoken answer to the question as part of the logon process.

The server 700 may be programmed to have other modules to perform respective functions. For example, server 700 may be programmed to have a password identification registration module to store the username and password entered by the user during registration; a password and identification verification module to receive the username and the password entered by the user during logon, and match the received username and the password with the username and password created and stored in registration. With these functions, the human-machine recognition assessment and control module 724 may not only determine if the user is human but also determine if the user is the registered user. The determination is based on both the result of matching the voiceprint and the result of matching the password and username.

The human-machine recognition assessment and control module 724 may first determine if the number of logon attempts by the same user or from the same terminal device has reached a preset threshold, and only instruct the voiceprint recognition module 723 to provide the voice authentication information for logon to the user when the result is negative.

The threshold value and length of the prescribed period time made be set based on empirical data or test data, such that the incidences where the network problems cause repeated logon tries are excluded.

Figure 8:
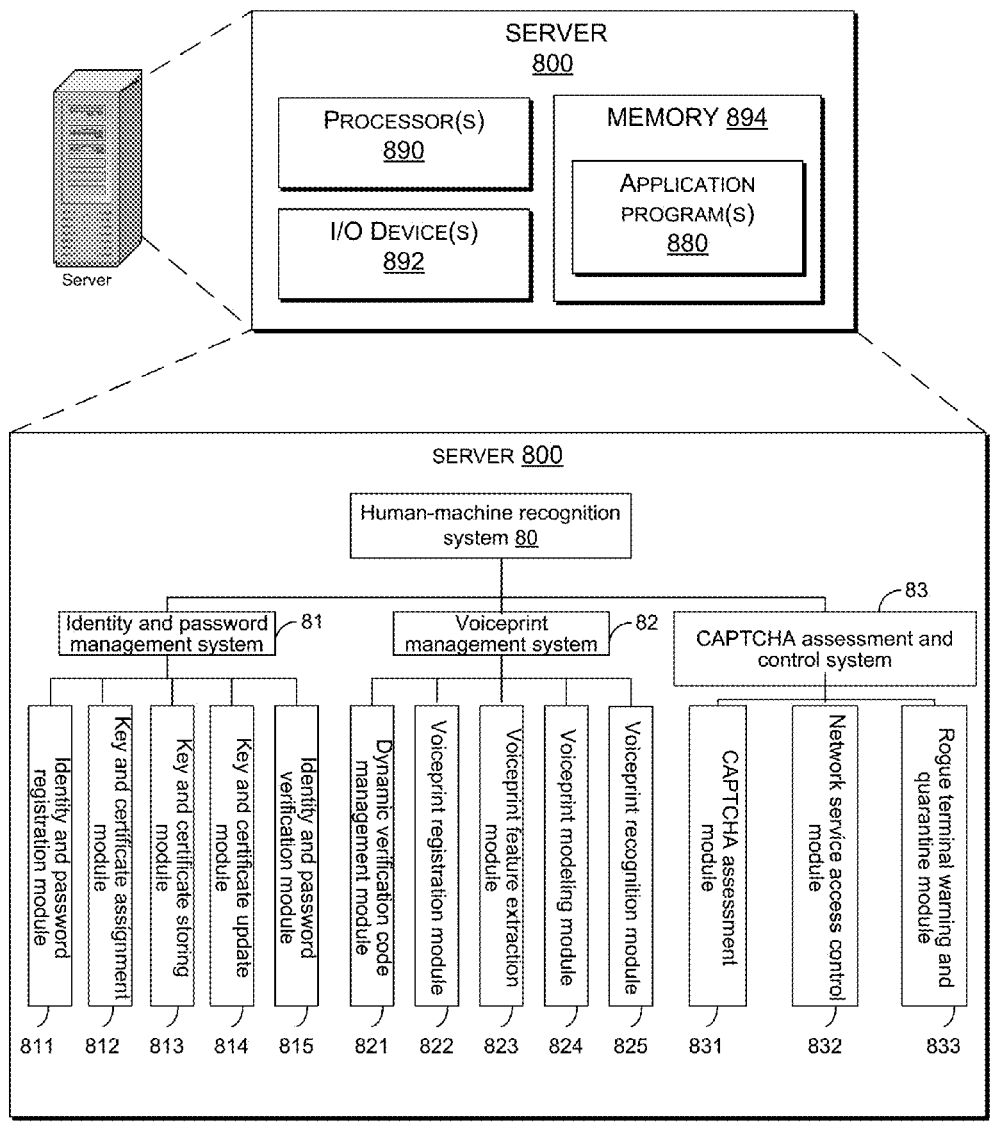
FIG. 8 is a schematic diagram of an implementation another human-machine recognition system which combines both traditional logon verification and voiceprint recognition.

FIG. 8 is a schematic diagram of an implementation another human-machine recognition system which combines both traditional logon verification and voiceprint recognition. The computer-based apparatus includes server 800 which has one or more processor(s) 890, I/O devices 892, memory 894 which stores application program(s) 880. The server 800 is programmed to have the functional modules as described in the following.

Human-machine recognition system 80 has subsystems including an identity and password management system 81, a voiceprint management system 82, and a CAPTCHA assessment and control system 83. These subsystems help decide the legitimacy of a user and the validity of the logon attempt by the user, based on verifying both the password identity of the user and the voiceprint of the user. The CAPTCHA assessment and control system 83 can further identify the anomalies where a single user is simultaneously using multiple terminals or multiple users are simultaneously using a single terminal.

(A) The identity and password management system 81 may be a password authentication server, including modules described in the following.

Identity and password registration module 811: This module is for the user to submit a request for registering a user ID and password with the identity management subsystem 81.

Key and certificate assignment module 812: Upon receiving by the module 811 a user request for registering a user ID and password, the key and certificate assignment module 812 verifies the legitimacy of the registration information, and assigns an appropriate key and certificate to the user if the verification is successful.

Key and certificate storing module 813: This module is for storing and managing the keys and certificates assigned to various users.

Key and certificate update module 814: This module is for modifying or revoking the keys and certificates previously assigned to various users.

Identity and password verification module 815: This module receives a request for verifying a user identity and password, and performs verification accordingly. The verification may involve verifying the validity of the user's key and the certificate. The identity and password verification module 815 may also have a submodule for requesting identity and password verification. However, this function of requesting may be implemented at a client terminal instead of on the server. The identity and password verification module 815 may be implemented on server 800, or on a separate server dedicated for user identity and password verification.

(B) Voiceprint management system 82 may be a voiceprint server, including modules described in the following.

Dynamic verification code management module 821: This module is responsible for generating, deleting and adding text-related dynamic authentication codes. In some embodiments, this module may be combined with voiceprint registration module 822 and/or voiceprint recognition module 825.

Voiceprint registration module 822: Upon receiving from the user terminal a request for registering a user identity based on voiceprint recognition, the voiceprint registration module 822 responses to the request by providing voice authentication information for registration to the user terminal. As described herein, the voice authentication information for registration may be a randomly generated voice authentication code including a string of alphanumerical characters which require a voice response by the user. In some embodiments, the alphanumerical characters in the voice authentication code are displayed without distortion at the user terminal. In some embodiments, the alphanumerical characters are displayed as distorted images.

Voiceprint feature extraction module 823: Upon receiving the voice response from the user terminal, this module samples the user voice and extracts voice features for building a voiceprint.

Voiceprint modeling module 824: This module builds a voiceprint by modeling based on the extracted voice features. In some embodiments, the voiceprint modeling module 824 may be combined with the voiceprint feature extraction module 823.

Voiceprint recognition module 825: When a user subsequently attempts to logon at a user terminal, the voice recognition module 825 compares the logon voiceprint of the user with the previously registered voiceprint of the user, and passes the result of the comparison to CAPTCHA assessment and control system 83. The voiceprint recognition module 825 may be designed to receive a spoken response to the voice authentication information for logon provided to the user, extract voice features, and build a logon voiceprint. Alternatively, these functions may be shared by the voiceprint feature extraction module 823 and the voiceprint modeling module 824, which may perform voice feature extraction and voiceprint modeling for both registration and logon.

(C) CAPTCHA assessment and control system 83 can be a CAPTCHA assessment and control server, including modules described as follows.

CAPTCHA assessment module 831: This module is for a final human-machine recognition. The CAPTCHA assessment module 831 receives the results from both the identity and password management system 81 and the voiceprint management system 82, evaluates the validity and legitimacy of the user and the logon request, in terms of both the traditional user ID and password verification and the voiceprint-based authentication, and determines if the user request to logon is to be permitted. The determination may have different kinds, such as permissible, invalid, not permissible, or malicious.

Network service access control module 832: This module controls the access to the requested network service by the user based on the result of CAPTCHA assessment module 831. The actions of the network service access control module 832 may correspond to the type of the determination made by CAPTCHA assessment module 831. For example, if the module 831 determines that the logon request is by an unauthorized user or a malicious computer program, the module 832 may trigger module rogue terminal warning and quarantine module 833 to generate an alarm or put the user or the user terminal on a blacklist.

Rogue terminal warning and quarantine module 833: make an appropriate response to an alarm or blacklist request from the network service access control module 832.

It is noted that the identity and password management system 81, the voiceprint management system 82, and the CAPTCHA assessment and control system 83 may be implemented on separate servers respectively, or combined in the same server system. The functional modules described herein may be deployed on edge routers either in a centralized model or a distributed model. The functions of the same module described herein are not required to be embodied in the same piece of hardware, but may be distributed over multiple pieces of hardware. Likewise, the functions of different modules may be deployed at the same piece of hardware.

The above embodiments of the apparatus are related to the embodiments of the method described herein, and detailed description of the embodiments of the method is also applicable to the embodiments of the apparatus and is therefore not repeated.

The technique described in the present disclosure may be implemented in a general computing equipment or environment or a specialized computing equipment or environment, including but not limited to personal computers, server computers, hand-held devices or portable devices, tablet devices, multiprocessor systems, microprocessor-based systems, set-top boxes, programmable consumer devices, network PCs, microcomputers and large-scale mainframe computers, or any distributed environment including one or more of the above examples.

The modules in particular may be implemented using computer program modules based on machine executable commands and codes. Generally, a computer program module may perform particular tasks or implement particular abstract data types of routines, programs, objects, components, data structures, and so on. Techniques described in the present disclosure can also be practiced in distributed computing environments, such a distributed computing environment, to perform the tasks by remote processing devices connected through a communication network. In a distributed computing environment, program modules may be located in either local or remote computer storage media including memory devices.

It is appreciated that the potential benefits and advantages discussed herein are not to be construed as a limitation or restriction to the scope of the appended claims.

Methods and apparatus of information verification have been described in the present disclosure in detail above. Exemplary embodiments are employed to illustrate the concept and implementation of the present invention in this disclosure. The exemplary embodiments are only used for better understanding of the method and the core concepts of the present disclosure. Based on the concepts in this disclosure, one of ordinary skills in the art may modify the exemplary embodiments and application fields.

What is claimed is:

1. A method registering a human user requesting registration, the method comprising:
    generating a set of n first kind elements, wherein n is an integer;
    creating a set of T second kind elements by combining non-repeating elements of the set of n first kind elements, wherein each second kind element is one of r-permutations of the set of n first kind elements, wherein r is an integer and r<n, and T≤R, R being a total number of r-permutations of the set of n first kind elements;
    providing the set of T second kind elements as registration authentication information to the human user, wherein the human user is prompted to provide a spoken response to the registration authentication information;

obtaining registration voice data from the spoken response to the registration authentication information; and establishing a registration voiceprint of the human user based on the obtained registration voice data.

2. The method as recited in claim 1, further comprising:

providing logon authentication information to a user requesting to logon;

prompting the user requesting to logon to provide a spoken response to the logon authentication information;

obtaining logon voice data from the spoken response to the logon authentication information;

establishing a logon voiceprint of the user requesting to logon based on the received logon voice data; and determining whether the user requesting to logon is human by comparing the logon voiceprint with the registration voiceprint.

3. The method as recited in claim 2, wherein the registration authentication information comprises a question, and the spoken response to the registration authentication information comprises reading aloud an answer to the question, and wherein the logon authentication information comprises the same question, and the spoken response to the logon authentication information comprises reading aloud the answer to the same question.

4. The method as recited in claim 2, wherein the registration authentication information comprises a plurality of questions, and the spoken response to the registration authentication information comprises reading aloud a respective answer to each of the plurality of questions, and wherein the logon authentication information comprises a question randomly selected from the plurality of questions, and the spoken response to the logon authentication information comprises reading aloud the respective answer to the question randomly selected from the plurality of questions.

5. The method as recited in claim 1, wherein the set of n first kind elements are generated randomly.

6. The method as recited in claim 1, wherein each of the set of n first kind elements includes an alphanumerical character.

7. The method as recited in claim 1, wherein the spoken response to the registration authentication information comprises reading aloud at least part of the registration authentication information.

8. A method determining whether a user requesting to logon is human, the method comprising:

providing logon authentication information to a user requesting to logon;

prompting the user requesting to logon to provide a spoken response to the logon authentication information;

obtaining logon voice data from the spoken response to the logon authentication information;

establishing a logon voiceprint of the user requesting to logon based on the received logon voice data; and determining whether the user requesting to logon is human by comparing the logon voiceprint with a registration voiceprint, wherein the registration voiceprint is based on previously obtained registration voice data from a spoken response to registration authentication information provided to the user requesting to logon, wherein the registration authentication information comprises of a set of T second kind elements comprising non-repeating elements of a set of n first kind elements, wherein n is an integer, wherein each second kind element is one of r-permutations of the set of n first kind elements, wherein r is an integer and r<n, and T≤R, R being a total number of r-permutations of the set of n first kind elements.

9. The method as recited in claim 8, further comprising:

generating the set of n first kind elements;

creating the set of T second kind elements by combining the non-repeating elements of the set of n first kind elements;

providing the set of T second kind elements as the registration authentication information to a human user, wherein the human user is prompted to provide the spoken response to the registration authentication information;

obtaining the registration voice data from the spoken response to the registration authentication information; and establishing the registration voiceprint of the human user based on the obtained registration voice data.

10. The method as recited in claim 9, the method further comprising:

establishing a registered user identification of the human user;

receiving logon user identification from the user requesting to logon;

identifying the user requesting to logon by matching the received logon user identification with the registered user identification of the human user; and determining the logon authentication information to be provided based on the registration authentication information of the human user identified to be the user requesting to logon.

11. The method as recited in claim 9, wherein the registration authentication information comprises a question, and the spoken response to the registration authentication information comprises reading aloud an answer to the question, and wherein the logon authentication information comprises the same question, and the spoken response to the logon authentication information comprises reading aloud the answer to the same question.

12. The method as recited in claim 9, wherein the registration authentication information comprises a plurality of questions, and the spoken response to the registration authentication information comprises reading aloud a respective answer to each of the plurality of questions, and wherein the logon authentication information comprises a question randomly selected from the plurality of questions, and the spoken response to the logon authentication information comprises reading aloud the respective answer to the question randomly selected from the plurality of questions.

13. The method as recited in claim 8, the method further comprising:

registering a password of the human user;

receiving a logon password from the user requesting to logon; and if the user requesting to logon is determined to be human, verifying that the user requesting to logon is the human user by matching the received logon password with the registered password of the human user.

14. The method as recited in claim 8, wherein the logon authentication information includes at least some of the registration authentication information.

15. The method as recited in claim 8, wherein the logon authentication information is a subset of the registration authentication information.

16. The method as recited in claim 8, wherein providing the logon authentication information to the user requesting to logon comprises:
   providing a subset of the set of T second kind elements as the logon authentication information to the user requesting to logon, the subset having t second kind elements, $t \leq T$.

17. The method as recited in claim 8, wherein providing the logon authentication information to the user requesting to logon comprises:
   creating a set of C third kind elements, each third kind element being a subset of the set of T second kind elements, the subset having t second kind elements, $t \leq T$; and
   providing at least one element of the set of C third kind elements as the logon authentication information to the human user.

18. The method as recited in claim 8, wherein the spoken response to the logon authentication information comprises reading aloud at least part of the logon authentication information.

19. The method as recited in claim 8, further comprising:
   counting a number of logon requests made by the user requesting to logon within a preset period of time; and
   rejecting a user's request to logon if the number of logon requests has reached a preset threshold value.

* * * * *